(12) United States Patent
Einhaus et al.

(10) Patent No.: US 6,227,764 B1
(45) Date of Patent: May 8, 2001

(54) PIPE REHABILITATION SYSTEM AND METHOD FOR INTRODUCING A LINING HOSE FROM A SEWER MAIN INTO A SERVICE PIPE

(75) Inventors: Gerhard Einhaus, Leimen; Herbert Schreiner, Steinheim, both of (DE)

(73) Assignee: KMG Kanal—Muller—Gruppe International GmbH & Co. KG (DE)

( * ) Notice: Subject to any disclaimer, the term of this patent is extended or adjusted under 35 U.S.C. 154(b) by 0 days.

(21) Appl. No.: 09/243,284

(22) Filed: Feb. 2, 1999

(30) Foreign Application Priority Data

Feb. 17, 1998 (DE) .......................... 298 02 675 U

(51) Int. Cl.⁷ .......................... E21D 11/00; F16L 55/16; F16L 57/00
(52) U.S. Cl. .......................... 405/157; 405/150.1; 138/98
(58) Field of Search .......................... 405/154, 156, 405/157, 184, 150.1; 138/97, 98

(56) References Cited

U.S. PATENT DOCUMENTS

| | | | |
|---|---|---|---|
| 4,135,958 | 1/1979 | Wood | 156/199 |
| 4,366,012 | 12/1982 | Wood | 156/93 |
| 4,401,696 | 8/1983 | Wood | 427/236 |
| 4,434,115 | 2/1984 | Chick | 264/36 |
| 4,439,469 | 3/1984 | Wood | 427/230 |
| 4,581,247 | 4/1986 | Wood | 427/53.1 |
| 4,602,974 | 7/1986 | Wood et al. | 156/287 |
| 4,622,196 | 11/1986 | Wood | 264/229 |
| 4,637,754 | 1/1987 | Wood | 405/150 |
| 4,714,095 | 12/1987 | Müller et al. | 138/98 |
| 4,758,454 | 7/1988 | Wood | 428/36 |
| 4,770,562 | 9/1988 | Müller et al. | 405/154 |
| 5,029,615 | 7/1991 | Müller et al. | 138/98 |
| 5,163,481 | 11/1992 | Catallo | 138/98 |
| 5,172,730 | 12/1992 | Driver | 138/104 |
| 5,280,811 | 1/1994 | Catallo et al. | 138/98 |
| 5,322,653 | 6/1994 | Müller | 264/35 |
| 5,358,359 | * 10/1994 | Long | 405/154 |
| 5,368,423 | 11/1994 | Hanna | 409/132 |
| 5,388,616 | 2/1995 | Müller et al. | 138/98 |
| 5,451,284 | * 9/1995 | Ikeda et al. | 405/154 X |
| 5,477,887 | 12/1995 | Catallo | 138/97 |
| 5,609,439 | 3/1997 | Schreiner et al. | 405/154 |
| 5,653,555 | 8/1997 | Catallo | 405/154 |
| 5,680,885 | 10/1997 | Catallo | 138/98 |
| 5,699,838 | 12/1997 | Catallo et al. | 141/65 |
| 5,700,110 | * 12/1997 | Kamiyama et al. | 405/154 |

FOREIGN PATENT DOCUMENTS

| | | | |
|---|---|---|---|
| 47832/90 | 5/1991 | (AU) | F16L/55/18 |
| 23 50 976 C2 | 4/1974 | (DE) | F16L/55/16 |
| 29 12 840 A1 | 3/1979 | (DE) | F16L/55/16 |
| 35 20 696 A1 | 6/1985 | (DE) | F16L/55/16 |

* cited by examiner

*Primary Examiner*—David Bagnell
*Assistant Examiner*—Tara L. Mayo
(74) *Attorney, Agent, or Firm*—Howrey Simon Arnold & White, LLP

(57) ABSTRACT

Apparatus for introducing a lining hose containing curable resin from a main pipeline, e.g. a sewer mains, into a lateral connection, e.g. a service pipe for a property, includes a shield having an arcuate configuration and complementing an inner contour of the main pipeline in an area of an inlet port of the lateral connection. The shield has an outlet opening destined for alignment with the inlet port of the lateral connection and is defined by a cross section which corresponds to a cross section of the inlet port of the lateral connection. A pipe having one end extends from the outlet opening inwardly into the main pipeline, and a conduit is connected to the other end of the pipe and provided for conducting a pressure fluid for everting a lining hose and an associated calibration hose in the lateral connection, with the calibration hose being secured adjacent the outlet opening of the shield.

18 Claims, 3 Drawing Sheets

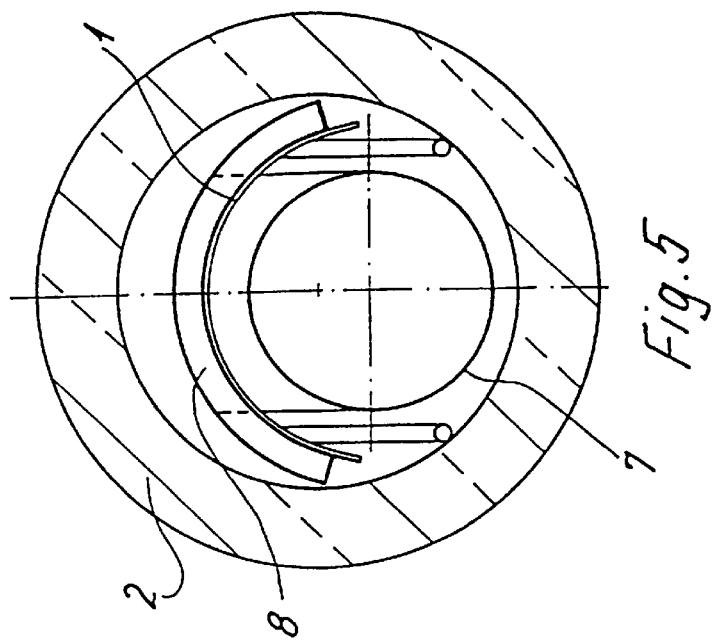
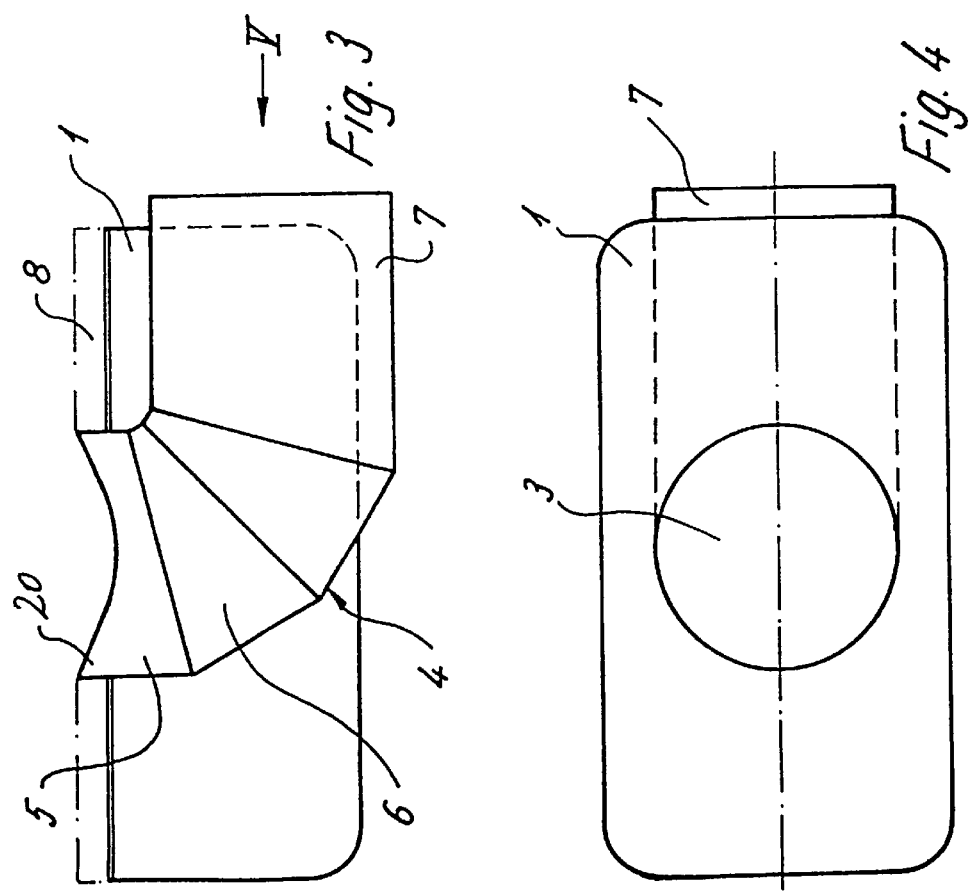

PIPE REHABILITATION SYSTEM AND METHOD FOR INTRODUCING A LINING HOSE FROM A SEWER MAIN INTO A SERVICE PIPE

CROSS-REFERENCES TO RELATED APPLICATIONS

This application claims the priority of German Patent Application, Serial No. 298 02 675.9, filed Feb. 17, 1998, the subject matter of which is incorporated herein by reference.

BACKGROUND OF THE INVENTION

The present invention relates, in general, to a pipe rehabilitation apparatus, and in particular to an apparatus for introducing a lining hose from a main pipeline, such as a sewer mains, into a lateral connection, such as a service pipe for a property.

SUMMARY OF THE INVENTION

It is a general object of the present invention to provide an improved pipe rehabilitation apparatus for introducing a lining hose from a main pipeline into a lateral connection.

In particular, it is an object of the present invention to provide a pipe rehabilitation apparatus by which a lining hose can be introduced together with a calibration hose in a simple manner from an outlet opening of the apparatus into the lateral connection.

These objects, and others which will become apparent hereinafter, are attained in accordance with the present invention by providing a shield having an arcuate configuration and complementing an inner contour of the main pipeline in an area of an inlet port of the lateral connection, with the shield having an outlet opening destined for alignment with the inlet port of the lateral connection and defined by a cross section which corresponds to a cross section of the inlet port of the lateral connection, a pipe having one end extending from the outlet opening of the shield inwardly into the main pipeline, and a conduit connected to the other end of the pipe for conducting a pressure fluid for everting the lining hose and the associated calibration hose in the lateral connection, with the calibration hose being secured adjacent the outlet opening of the shield.

According to another feature of the present invention, the pipe has an angular configuration and is comprised of a first pipe section extending vertically from the outlet opening, a second pipe section extending substantially horizontal to the first pipe section, and a transition piece for connecting the first and second pipe sections, whereby the conduit is attached to the second pipe section.

The shield is moved in the main pipeline by means of a transport and positioning unit which includes a cantilever arm, whereby the shield is articulated to the cantilever arm so as to be adjustable by the cantilever arm in multiple dimensions and lockable in the adjusted position.

As the inlet port of the lateral connection may be located at different areas of the main pipeline, the shield is swingably mounted to the transport and positioning unit for rotation about a great angular range of e.g. 180°. Also, after alignment of the outlet opening of the shield for passage of the lining hose and the calibration hose, the shield must be pressed against the inner contour of the main pipeline. In accordance with the present invention, the conformation of the shield surface with respect to the structured inner surface of the main pipeline is realized by an elastic padding which is arranged on the outer surface of the shield. However, it is also conceivable, to render the shield of elastically deformable material so as to realize the required conformation of the shield with respect to the inner contour of the sewer mains.

BRIEF DESCRIPTION OF THE DRAWING

The above and other objects, features and advantages of the present invention will now be described in more detail with reference to the accompanying drawing, in which:

FIG. 3 is an enlarged detailed view of a shield for use in the apparatus according to the present invention;

FIG. 4 is a plan view of the shield of FIG. 3; and

FIG. 5 is a view of the shield, taken in direction of arrow V in FIG. 3, with the shield inserted in the main pipeline.

DETAILED DESCRIPTION OF PREFERRED EMBODIMENTS

Figure 1:
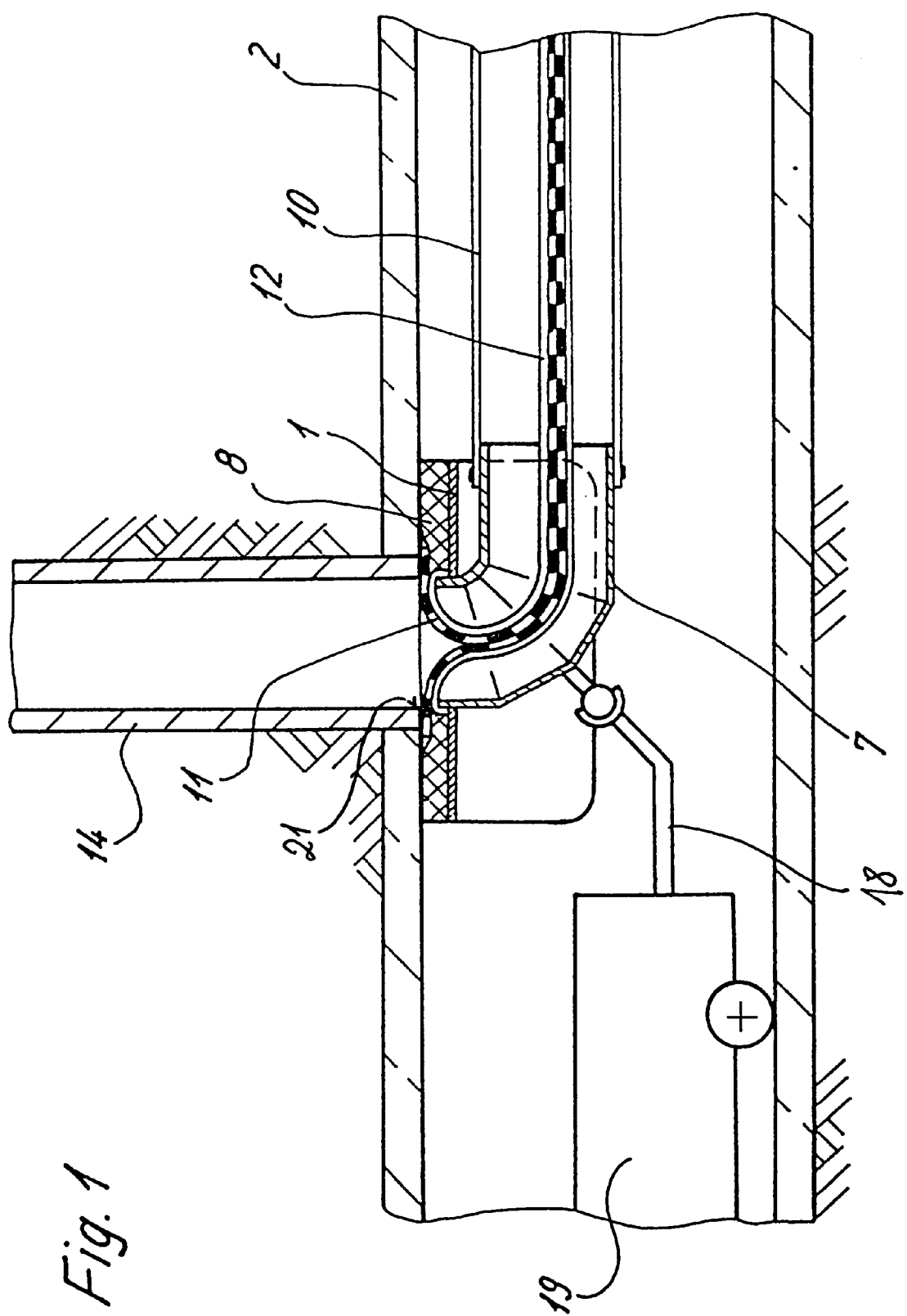
FIG. 1 is a sectional view of a sewer system comprised of a sewer mains and a lateral service connection for a property, having incorporated therein in the area of the inlet port a pipe rehabilitation apparatus in accordance with the present invention for introducing into the lateral connection a lining hose and a calibration hose.

Throughout all the Figures, same or corresponding elements are generally indicated by same reference numerals.

Turning now to the drawing, and in particular to FIG. 1, there is shown a sectional view of a sewer system comprised of a main pipeline 2, e.g. a sewer mains, and a lateral connection 14, e.g. a service pipe which branches off the main pipeline 2 and leads to a property. Incorporated in the main pipeline 2 is a pipe rehabilitation apparatus according to the present invention for introducing into the lateral connection 14 a flexible lining hose 11 and an associated calibration hose 12. The lining hose 11 is provided in the form of a textile structure having a layer of curable resin and is outwardly adjoined and surrounded by the calibration hose 12. These type of hoses are generally known to the artisan so that a detailed discussion thereof is omitted for the sake of simplicity.

It is further noted that in the following description, the term "forward" will denote a direction toward the lateral connection 14, while the term "rear" or "rearward" will denote the opposite direction, i.e. a direction away from the lateral connection 14.

The pipe rehabilitation apparatus includes a shield 1 which has an arcuate configuration and is conformed to the inner contour of the main pipeline 2, as shown in particular in FIG. 5. The shield 1 is made of elastically deformable material, e.g. metal, and defines an outlet opening 3 (FIG. 4) which can be brought in alignment with an inlet port 21 of the lateral connection 14. Received in and bounding the outlet opening 3 is a short pipe section 20 which extends substantially vertically and outwardly from the shield 1 toward the lateral connection 14 and forms part of an angular or elbow-shaped pipe, generally designated by reference numeral 4 and shown in detail in FIG. 3. The pipe 4 further includes a pipe section 5 which extends inwardly from the outlet opening 3 and is connected via a curved tubular transition section 6 to a horizontal or substantially horizontal pipe section 7.

Sandwiched between the shield 1 and the confronting inside surface 9 of the main pipeline 2 is a padding 8 which is made of elastic material and via which the shield 1 is able to elastically bear upon the inside surface 9 of the main pipeline 2, with the padding 8 assuming the configuration of the inside surface 9.

Figure 2:
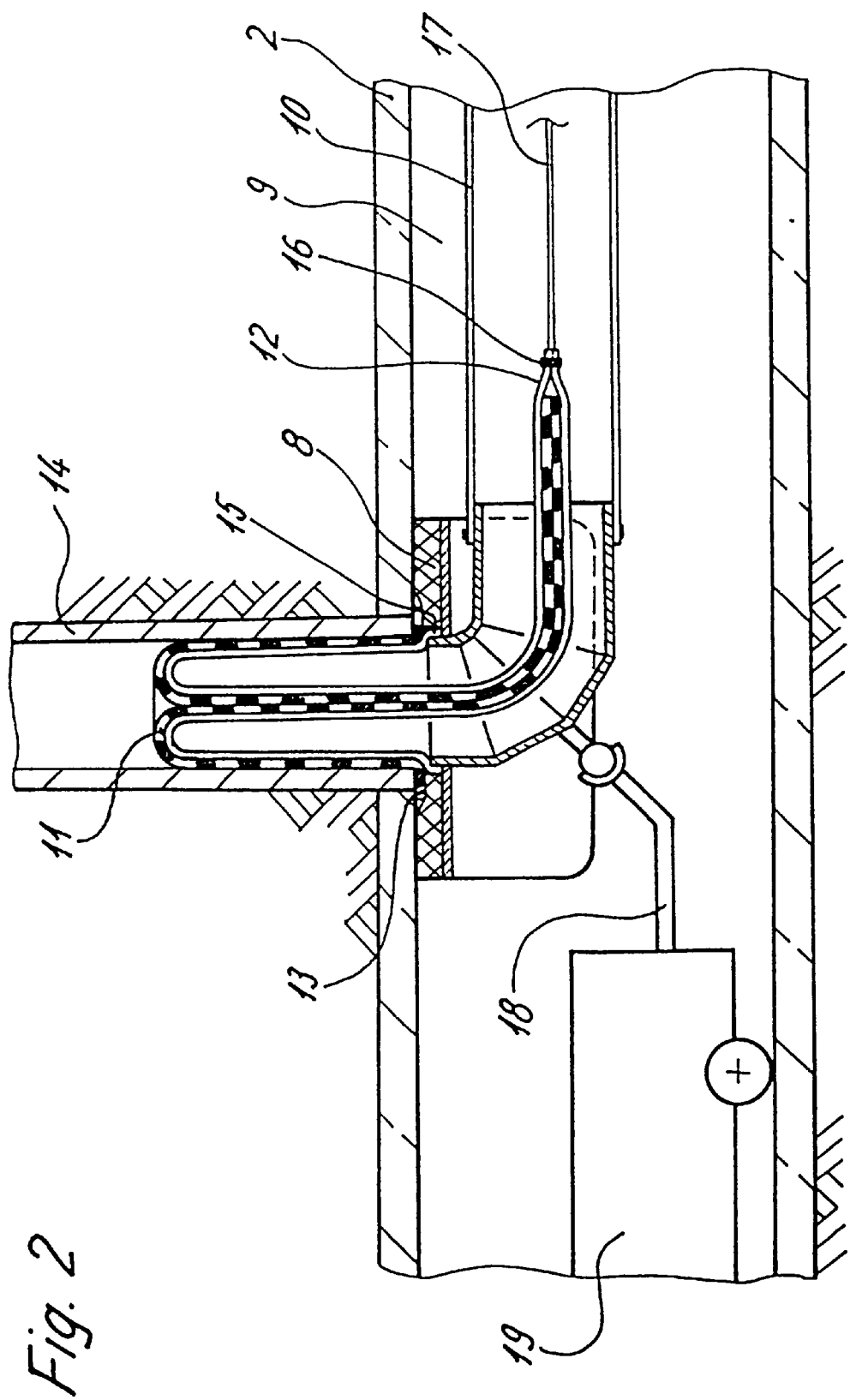
FIG. 2 is a sectional view of the sewer system, with a section of the lateral connection being lined by the lining hose.

Secured to the rear end of the pipe section 7 is a conduit 10, e.g. a pipe or tube, for conduction of a pressure fluid, e.g. water, for pushing the lining hose 11 and the calibration hose 12 into the lateral connection 14 to be rehabilitated, in such a manner that the calibration hose 12 is everted by the pressure applied by the pressure fluid to thereby force the lining hose 11 to adhere to the inside wall surface of the lateral connection 14, as shown in FIG. 2. The lining hose 11 thus applied is held in position until the resin cures, to thereby realize a rigid lining along the inside wall surface of the lateral connection 14. This technique is well established so that further discussion is omitted for sake of simplicity.

As shown in FIGS. 1 and 2, the forward end of the lining hose 11 is formed with a collar 13 which bears in the junction area between the lateral connection 14 and the main pipeline 2 against the inside surface 9 of the main pipeline 2, to thereby circumscribe the inlet port 21 of the lateral connection 14. The forward end 15 of the calibration hose 12 is bent outwardly around the front end of the pipe section 20 of the shield 1 and secured there.

Attached to the rearward end 16 of the calibration 12 is a rope 17 for allowing a withdrawal of the calibration hose 12 for renewed use, after the lining hose 11 contacts and adheres to the inside surface of the lateral connection 14 and after the resin in the lining hose 11 has cured.

The shield 1 is mounted on the free end of a cantilever arm 18 which defines a longitudinal axis which coincides with a center axis of the main pipeline 2 and is controlled by a transport and positioning unit 19 capable of traveling in the main pipeline 2. The cantilever arm 18 can be adjusted in several dimensions, to thereby allow to position and to lock in place the shield 1 in desired positions. The shield 1 can be pivoted about the center longitudinal axis of the main pipeline 2 so that each position of the inlet port 21 of the lateral connection 14 can be targeted.

While the invention has been illustrated and described as embodied in a pipe rehabilitation apparatus for introducing a lining hose from a sewer mains into a service pipe for a property, it is not intended to be limited to the details shown since various modifications and structural changes may be made without departing in any way from the spirit of the present invention.

What is claimed as new and desired to be protected by Letters Patent is set forth in the appended claims:

1. A pipe rehabilitation system for introducing a lining hose containing curable resin from a main pipeline into a lateral connection, comprising:
    a shield having an arcuate configuration and complementing an inner contour of a main pipeline in an area of an inlet port of a lateral connection of said main pipeline, said shield having an outlet opening to be aligned with the inlet port of the lateral connection and defined by a cross section which corresponds to a cross section of the inlet port of the lateral connection;
    a pipe having a first end extending from the outlet opening inwardly into the main pipeline, and a second end;
    a lining hose containing curable resin and having associated therewith a calibration hose; and
    a conduit connected to the second end of the pipe and provided for conducting a pressurized fluid for everting the lining hose and the calibration hose in the lateral connection, a rope being secured to a closed end of the calibration hose, an open end of the calibration hose being secured adjacent the outlet opening of the shield, the calibration hose being removable from the lateral connection by the rope.

2. The system of claim 1 wherein the pipe has an angular configuration and is comprised of a first pipe section extending vertically from the outlet opening, a second pipe section extending substantially horizontal to the first pipe section, and a transition section for connecting the first and second pipe sections, said conduit being attached to the second pipe section.

3. The system of claim 1 wherein the conduit is formed as hose or tube.

4. The system of claim 1 wherein the shield includes a short pipe section extending from the outlet opening outwardly for attachment of an end of the calibration hose capable of being everted in the lateral connection.

5. The system of claim 1, and further comprising a padding made of elastically deformable material and attached externally onto the shield to clear the outlet opening, said lining hose having a collar supported by the padding and circumscribing the outlet opening.

6. The system of claim 1 wherein the shield is made of elastically deformable material.

7. The system of claim 1, and further comprising a transport and positioning unit traveling in the main pipeline and having a cantilever arm which is adjustable multidimensionally, said shield being articulated to the cantilever arm.

8. The system of claim 7 wherein the shield is adjustable multidimensionally with respect to the cantilever arm and lockable in an adjusted position.

9. The system of claim 7 wherein the cantilever arm defines a longitudinal axis which coincides with a center axis of the main pipeline, said shield being swingable by the cantilever arm about 180° and positionable against the inner contour of the main pipeline.

10. A method for rehabilitating a lateral connection from within a main pipeline, comprising:
    providing a lining hose outwardly adjoined by a reusable calibration hose, a rope being secured to a closed end of the reusable calibration hose, the lining hose having a layer of curable material;
    providing a shield having an arcuate configuration and complementing an inner contour of the main pipeline in an area of an inlet port of the lateral connection;
    aligning an outlet opening of the shield with the inlet port of the lateral connection such that an open end of the reusable calibration hose is secured adjacent the outlet opening of the shield, the outlet opening of the shield being defined by a cross section which corresponds to a cross section of the inlet port of the lateral connection;
    extending a first end of a pipe from the outlet opening inwardly into the main pipeline;
    connecting a conduit to a second end of the pipe;
    conducting a pressurized fluid into the conduit;
    everting the lining hose and the reusable calibration hose into the lateral connection until the curable layer of the lining hose is cured to the lateral connection; and
    removing the calibration hose from the lateral connection by pulling the rope.

11. The method of claim 10 in which the steps of extending and connecting includes:
    constructing the pipe from a first pipe section extending vertically from the outlet opening, a second pipe section extending substantially horizontal to the first pipe section, and an angular transition section for connecting the first and second pipe sections; and attaching the conduit to the second pipe section.

12. The method of claim 10 further comprising:

reusing the calibration hose in conjunction with a new lining hose to rehabilitate another lateral connection.

13. The method of claim 10 in which the step of aligining includes:

extending a short pipe section from the outlet opening outwardly; and attaching the open end of the calibration hose to the short pipe section.

14. The method of claim 10 in which the steps of providing a shield and aligning include:

providing a padding made of elastically deformable material;

attaching the padding externally onto the shield as to clear the outlet opening;

supporting a collar on the lining hose by the padding; and circumscribing the outlet opening with the padding.

15. The method of claim 10 further comprising:

adjusting a location of the shield by moving a multidimensionally adjustable cantilever arm on a transport and positioning unit traveling in the main pipeline, the shield being articulated to the cantilever arm.

16. The method of claim 15 further comprising:

locking the cantilever arm in a location to lock the shield in an adjusted position.

17. The method of claim 15 in which the steps of adjusting includes:

defining a longitudinal axis of the cantilever arm which coincides with a center axis of the main pipeline;

swinging the shield by the cantilever arm 180°; and pushing the shield against the inner contour of the main pipeline.

18. A pipe rehabilitation system for introducing a lining hose containing curable resin from a main pipeline into a lateral connection, comprising:

a shield having an arcuate configuration and complementing an inner contour of a main pipeline in an area of an inlet port of a lateral connection of said main pipeline, the shield having an outlet opening for alignment with the inlet port of the lateral connection and defined by a cross section which corresponds to a cross section of the inlet port of the lateral connection, the shield including a short pipe section extending from the outlet opening outwardly for attachment of an end of the calibration hose capable of being everted in the lateral connection, the shield being made of elastically deformable material;

a padding made of elastically deformable material and attached externally onto the shield to clear the outlet opening;

a lining hose having curable resin and an associated reusable calibration hose, said lining hose having a collar supported by the padding and circumscribing the outlet opening;

a pipe having a first end extending from the outlet opening inwardly into the main pipeline and a second end, the pipe having an angular configuration and comprised of a first pipe section extending vertically from the outlet opening, a second pipe section extending substantially horizontal to the first pipe section, and a transition section for connecting the first and second pipe sections;

a transport and positioning unit traveling in the main pipeline and having a cantilever arm which is adjustable multidimensionally, said shield being articulated to the cantilever arm, the shield being adjustable multidimensionally with respect to the cantilever arm and lockable in an adjusted position, the cantilever arm defining a longitudinal axis which coincides with a center axis of the main pipeline, said shield being swingable by the cantilever arm about 180° and positionable against the inner contour of the main pipeline; and a tube conduit connected to the second end of the pipe and provided for conducting a pressurized fluid for everting the lining hose and the associated reusable calibration hose in the lateral connection, a rope being secured to a closed end of the calibration hose, an open end of the calibration hose being secured adjacent the outlet opening of the shield, the calibration hose being removable from the lateral connection by the rope.

* * * * *